Oct. 10, 1961  O. F. FLAUGH ET AL  3,003,567
COMBINED MECHANICAL PITCH LOCK AND PITCH STOP ASSEMBLY
Filed Aug. 20, 1958  4 Sheets-Sheet 1

INVENTORS
Oren F. Flaugh
Richard A. Hirsch
James R. Mansfield
BY
D.C. Staley
Attorney Oct. 10, 1961     O. F. FLAUGH ET AL     3,003,567
COMBINED MECHANICAL PITCH LOCK AND PITCH STOP ASSEMBLY
Filed Aug. 20, 1958                          4 Sheets-Sheet 2

INVENTORS
OREN F. FLAUGH
BY RICHARD A. HIRSCH
JAMES R. MANSFIELD
Craig V. Morton
ATTORNEY

LOW PITCH       GOVERNING     FEATHER     NEGATIVE
STOP POSITION    RANGE

United States Patent Office

3,003,567
Patented Oct. 10, 1961

3,003,567
COMBINED MECHANICAL PITCH LOCK AND PITCH STOP ASSEMBLY
Oren F. Flaugh, Dayton, Richard A. Hirsch, West Milton, and James R. Mansfield, Troy, Ohio, assignors to General Motors Corporation, Detroit, Mich., a corporation of Delaware
Filed Aug. 20, 1958, Ser. No. 756,219
16 Claims. (Cl. 170—160.33)

This invention pertains to variable pitch propellers, and particularly to a combined mechanical low pitch stop and mechanical pitch lock assembly for variable pitch propellers, and is a continuation in part of applications Serial No. 545,033, now abandoned, and Serial No. 545,034, filed November 4, 1955, now Patent 2,957,528.

Heretofore, it has been recognized that hydraulically controlled variable pitch propellers must include lock means for preventing movement of the propeller blades to a low pitch position wherein no positive thrust is developed, and in some cases, negative thrust is developed, due to the centrifugal and aerodynamic blade twisting moments when the aircraft is in flight upon failure of the hydraulic control system. It has also been recognized that a variable pitch propeller must include stop means for limiting movement of the blades in a decrease pitch direction during constant speed propeller operation. The stop means prevent the blades from moving to a pitch position where in negative thrust is developed when the aircraft is in flight. The present invention relates to a combined mechanical pitch lock and stop assembly and a mechanical pitch lock, per se, for preventing movement of the propeller blades to a decrease pitch direction upon malfunctioning of the propeller. Accordingly, among our objects are the provision of a combined mechanical pitch lock and pitch stop assembly for variable pitch propellers; the further provision of a mechanical pitch lock assembly for a variable pitch propeller which prevents movement of the blades in a decrease pitch direction under certain conditions; the further provision of a mechanical pitch lock control valve assembly for a variable pitch propeller which is responsive to the speed of propeller rotation and includes means for adjusting the speed setting of the pitch lock control means; and the still further provision of a mechanical pitch lock assembly including means for preventing locking operation thereof when the propeller is operated in the feathering and negative thrust ranges while permitting locking operation when the propeller is operated in the governing range.

The aforementioned and other objects are accomplished in the present invention by incorporating means for mechanically locking the propeller master gear to the hub through ratchet teeth so as to prevent movement of the propeller blades in a decrease pitch direction under certain conditions, while at all times permitting movement of the blades in an increase pitch direction, and in addition incorporating mechanical stop means including a rotatable member driven by the master gear. Specifically, the propeller may be generally of the type disclosed in the Blanchard et al. Patents Nos. 2,307,101 and 2,307,102, wherein each propeller blade has its own hydraulic torque unit for adjusting the pitch position thereof. Each propeller blade is operatively connected to a bevel type blade gear, and the several blade gears mesh with a master gear supported in the hub for rotation about the horizontal propeller axis. The master gear coordinates the movement of all propeller blades through the blade gears.

The master gear is formed with an axially extending annular flange, the end of which has a plurality of radially extending, circumferentially spaced ratched teeth thereon. A complementary ratched toothed lock ring is disposed within the hub and movable axially relative thereto into and out of engagement with the master gear. The pitch lock ring is connected to the hub by a straight spline connection, and, hence is restrained against rotation relative to the hub. The pitch lock ring has a plurality of circumferentially spaced cavities within which springs are disposed. The springs react against an abutment immovable relative to the hub, and urge the pitch lock rings into engagement with the master gear.

The pitch lock ring is also formed with a piston surface which is normally subjected to fluid under pressure acting in opposition to the springs to maintain the pitch lock ring disengaged from the master gear. The pitch lock assembly also includes a sleeve, which is coaxial with the pitch lock ring and spaced radially inward thereof. The sleeve has a plurality of circumferentially spaced, straight splined sections which terminate in abrupt arcuate shoulders. The pitch lock ring has an equal number of radially inward extending circumferentially spaced spline blocks, or lugs. When the propeller blades are in the governing range, the sleeve, which is connected to rotate with the master gear, assumes an angular position wherein the pitch lock spline blocks are aligned with the smooth arcuate sections of the sleeve, thereby permitting axial movement of the pitch lock ring into engagement with the master gear. However, when the propeller blades are in either the feathering range or the negative thrust range, the arcuate shoulders of the sleeve are aligned with the spline blocks of the pitch lock ring so as to positively maintain the pitch lock ring and the master gear disengaged.

As aforementioned, the master gear is connected by straight splines to a sleeve coaxial with the horizontal propeller axis. The sleeve has a radially extending annular flange, the outer end surface of which has a plurality of circumferentially spaced jaws extending axially therefrom. A second sleeve, coaxial with the propeller axis is slidably received within the first mentioned sleeve. The second sleeve has an annular flange portion constituting a piston, the piston having a surface exposed to a servo chamber. The second sleeve has bolted thereto an annulus having a plurality of circumferentially spaced jaws arranged to cooperate with the jaws on the first sleeve. The piston and the annulus are normally urged towards the first sleeve by a plurality of springs, and the annulus is restrained against rotation relative to the hub by reason of having a straight spline connection therewith. The coacting jaws on the first sleeve and the annulus have inclined cam, or ramp, surfaces at one end which enable movement of the propeller blades to a feathering position. The other ends of the jaws terminate in abrupt shoulders which abut at a predetermined minimum safe low angle in the governing range.

During propeller operation in the governing range, the pitch lock ring is normally held in the disengaged position by fluid under pressure. The application of pressure to the pitch lock piston is controlled by a valve responsive to the speed of propeller rotation or loss of hydraulic fluid. The speed setting of the pitch lock control valve is slightly higher than the speed setting of the governor valve, and the speed settings of both valves can be simultaneously adjusted. When the propeller speed exceeds the setting of the pitch lock control valve, for any reason, the pitch lock control valve will connect the servo chamber to drain and the springs will immediately shift the lock ring axially into engagement with the master gear so as to prevent further movement of the blades in a decrease pitch direction. However, due to the ratchet teeth on both the master gear and the pitch lock ring, the propeller blades can always be moved in an increase pitch direction.

During propeller operation in the governing range, the servo chamber is connected to drain, and hence, the mechanical low pitch stop is conditioned for operation. When negative thrust operation is selected, the servo chamber is subjected to fluid under pressure and the piston moves axially to separate the coacting jaws. With the mechanical low pitch stop in the disengaged position, the propeller blades can be moved to a pitch position below the normal low pitch stop angle.

Figure 1:
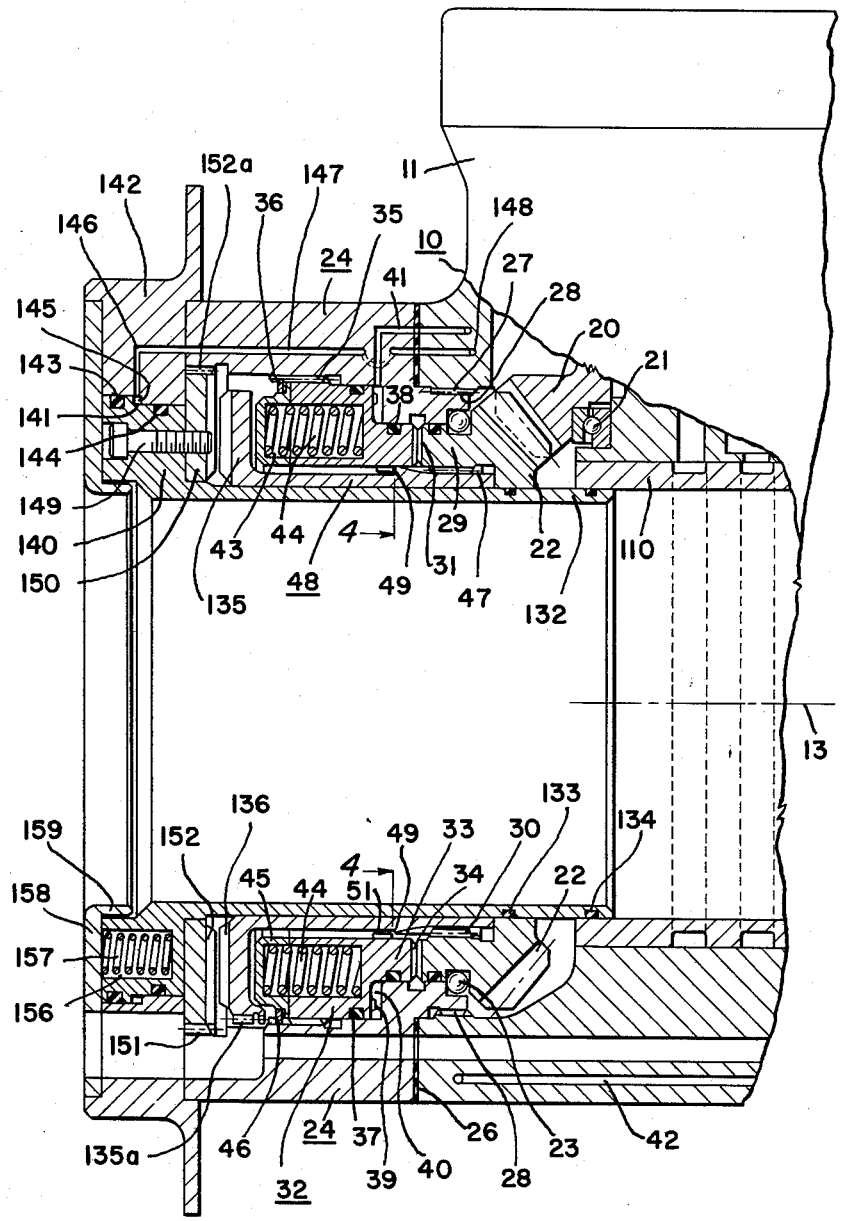
FIGURE 1 is a fragmentary view, partly in section and partly in elevation, of a variable pitch propeller including the combined mechanical pitch lock and pitch stop of this invention.
Figure 2:
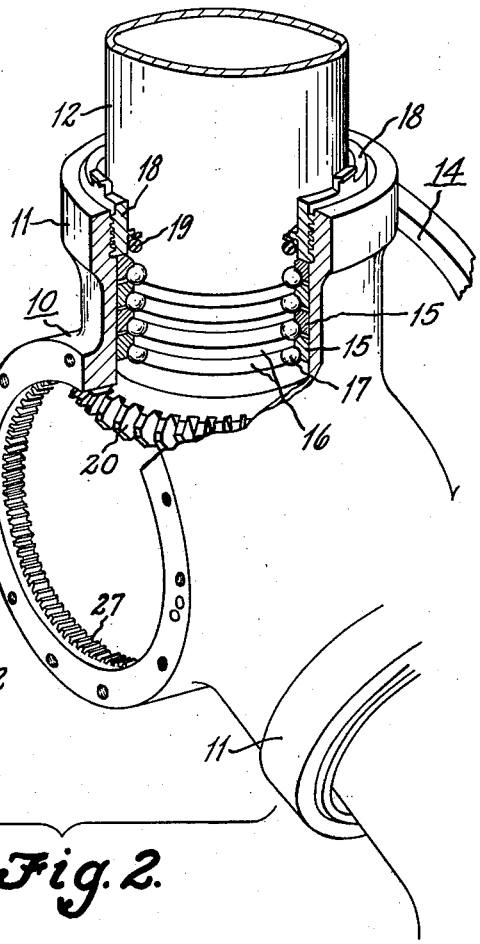
FIGURE 2 is an exploded perspective view, partly in section and partly in elevation, of a propeller constructed according to the present invention.

With particular reference to FIGURES 1 and 2, the propeller is shown comprising a hub 10 having a plurality of radially extending sockets 11 within which propeller blades 12 are journalled for rotation about their longitudinal axes to different pitch positions. The hub 10 is drivingly connected to an engine driven shaft, not shown, and rotates about a horizontal axis depicted by the numeral 13 in FIGURE 1. A regulator assembly 14 is attached to the rear of the hub and rotates therewith, the fluid pressure system for varying the pitch of the propeller blades 12 being disposed within the regulator in accordance with the teachings of the aforementioned Blanchard et al. patents.

With particular reference to FIGURE 2, the propeller blades 12 are mounted in the hub socket 11 by a combined radial and thrust bearing stack comprising outer races 15, inner races 16 integral with the root portions of the blades and a plurality of ball bearings 17 disposed therebetween. The outer races 15 are restrained against outward radial movement radial to the hub by a retaining nut 18 having threaded engagement with the socket 11. A suitable grease seal 19 is carried by the retaining nut 18 and engages the root portion of the blade 12. Each propeller blade 12 is operatively connected to a bevel type gear sector 20, which is journalled for rotation relative to the hub 10 by a ball bearing assembly 21.

The several blade gears 20 mesh with a master gear 22 journalled for rotation about the horizontal propeller axis 13 by a ball bearing assembly 23, which is supported between the master gear 22 and an annular member 24, which is attached to the front of the hub 10 by a plurality of bolts, one of which is indicated by numeral 25 in FIGURE 2, a suitable gasket 26 being interposed between the mating surfaces thereof. The annular member 24, or pitch lock housing, has an external series of straight spline teeth 28 which mate with an internal series of straight spline teeth 27 on the hub 10. Thus, the annular member 24 is restrained against rotation relative to the hub 10.

The master gear 22 is formed with an axially extending flange 29 coaxial with the hub axis 13. The internal periphery of the axially extending flange 29 is formed with a set of straight spline teeth 30, and the end face of the flange 29 has formed thereon circumferentially spaced ratchet teeth 31. Thus, the flange 29 constitutes one of the pitch locking elements. The other pitch locking element comprises an annular member 32 having an annular flange portion 33 located in juxtaposition with respect to the flange 29 of the master gear 22. The end surface of the flange 33 is formed with a complementary set of ratchet teeth 34. The annular member 32 constitutes a pitch lock ring and is supported for axial movement within the member 24. However, the pitch lock ring 32 is restrained against rotation relative to the member 24 by reason of having an exterior set of straight splines 35 mating with an interior set of straight splines 36 on the member 24.

The pitch lock ring 32 carries seals 37 and 38 which engage internal surfaces of the member 24. In addition, the ring 32 is formed with a shoulder which presents a piston surface 39, the piston surface 39 being exposed to servo chamber 40 formed by the pitch lock ring 32 and the member 24. The servo chamber 40 communicates with a passage 41 in the member 24, and a passage 42 in the hub 10. When the servo chamber 40 is subjected to fluid under pressure, the pitch lock ring 32 will be held in disengaged position, as depicted in FIGURE 1.

The pitch lock ring 32 is also formed with a plurality of circumferentially spaced cavities 43 within which compression springs 44 are disposed. One end of the cavities 43 is closed by a plate 45, which is connected to the member 24 by means of a snap ring 46. The springs 44 react against the end wall of the plate 45 and urge the pitch lock ring to the right, as viewed in FIGURE 1, into engagement with the master gear 22. However, when the servo chamber 40 is subjected to fluid under pressure, the pitch lock ring is maintained in a disengaged position relative to the master gear 22.

Figure 3:
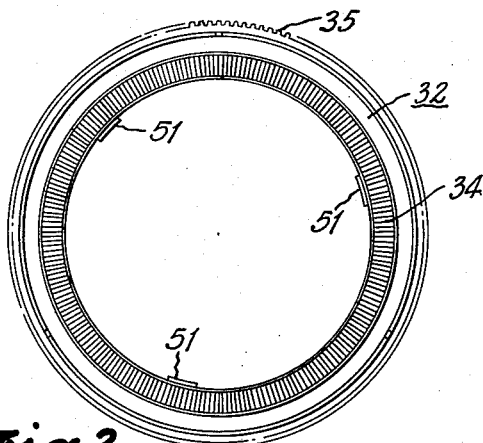
FIGURE 3 is an end view, in elevation, of the pitch lock ring.
Figure 4:
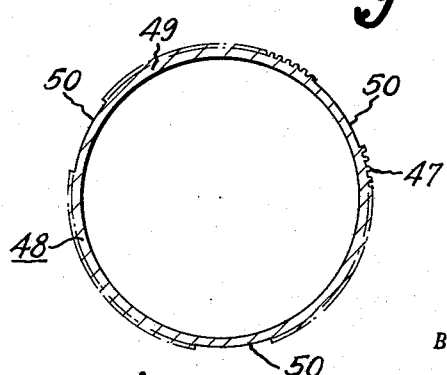
FIGURE 4 is a sectional view taken along line 4—4 of FIGURE 1.

With particular reference to FIGURES 1, 3 and 4, the internal straight splines 30 of the master gear 22 mate with circumferentially spaced sets of straight splines 47 on a sleeve 48. The straight splined sections 47 terminate in abrupt shoulders 49, as seen in FIGURES 1 and 4. Between the arcuate shoulders 49 on the sleeve 48 are formed reduced diameter arcuate sections 50 which extend throughout an arcuate distance equal to the angular movement imparted to the master gear 22 during propeller operation in the governing range. The internal periphery of the pitch lock ring 32 is formed with three circumferentially spaced spline blocks, arcuate abutments or lugs, 51. Since the pitch lock ring 32 is restrained against rotation relative to the hub 10, the lugs 51 will have a fixed angular relation relative to the hub. However, the angular position of the arcuate shoulders 49 on the sleeve 48 will vary with changes in the pitch positions of the propeller blades 12. The arrangement of the lugs 51 on the pitch lock ring 32 and the sleeve 48 is such that when the propeller blades are in the governing range between the flight idle angle and the maximum positive governing pitch angle, the lugs 51 will be aligned with reduced diameter arcuate sections 50. In this manner, when the servo chamber 40 is connected to drain, the springs 44 will react against the plate 45 and move the pitch lock ring axially to the right, as viewed in FIGURE 1, so that the ratchet teeth 34 engage the ratchet teeth 31 and lock the propeller blades against pitch changing movement in a decrease pitch direction by restraining rotation of the master gear 22 in a decrease pitch direction. The positive mechanical pitch lock can only be disengaged by applying fluid under pressure to the servo chamber 40.

During propeller operation in the negative thrust range and in the feathering range, the master gear 22 and the sleeve 48 will have an angular position with respect to the hub wherein the lugs 51 of the pitch lock ring 32 are aligned with the shoulders 49 of the sleeve 48. Thus, when the propeller is operated in the negative thrust and feathering ranges, the pitch lock ring 32 is positively maintained out of engagement with the master gear 22.

Figure 7:
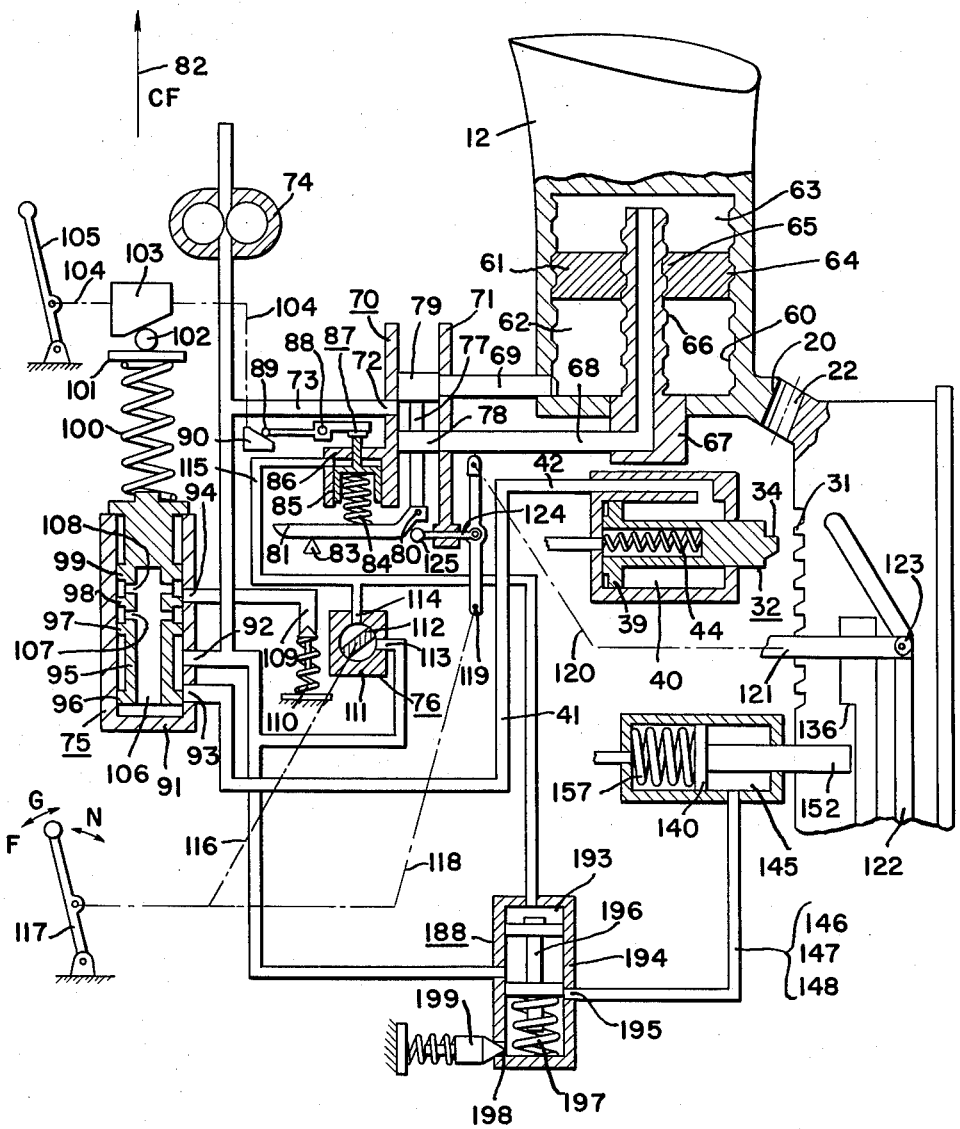
FIGURE 7 is a schematic diagram illustrating a fluid pressure system for controlling a variable pitch propeller having the combined mechanical pitch lock and pitch stop of this invention.

With particular reference to FIGURE 7, the schematically illustrated pitch changing system and pitch lock control will be described, like numerals indicating like parts shown in the previous figures. The propeller blade 12 is shown having a torque unit of the type disclosed in the Martin et al. Patent No. 2,500,692, which torque unit includes a cylinder having internal helical splines 60 which are shown integral with the blade 12. A reciprocable piston 61 divides the cylinder into an increase pitch chamber 62 and a decrease pitch chamber 63. The piston 61 has external helical splines 64 which mate with the helical splines 66 formed on a fixed reaction member 67, which is secured to the propeller hub. The propeller blade gear 20 meshes with the master gear 22 which is shown having ratchet teeth 31. The pitch locking member 32 is shown connected to the piston 39, the member 32 being urged towards the ratchet teeth 31 on the master gear 22 by a spring 44. The servo chamber 40 is connected to passages 41 and 42 by which means the servo chamber may be subjected to fluid under pressure to disengage the pitch lock.

The increase pitch chamber 62 is connected to a conduit 69 and the decrease pitch chamber 63 is connected to a conduit 68. The application of pressure to and drain from the torque unit chambers is controlled by a governor valve generally depicted by the numeral 70. The governor valve 70 includes a valve guide 71 having a pressure supply port 72 connected to a conduit 73, which communicates with the outlet of a pump 74. The pressure supply conduit 73 also communicates with a pitch lock control valve 75 and a selector valve 76. The governor valve 70 also includes a centrifugally responsive plunger 77 having spaced lands 78 and 79, the plunger being pivotally connected at 80 to a lever 81. The plunger 77 and the lever 81 respond directly to the thrust of centrifugal force in the direction of arrow 82, the lever pivoting about a fixed fulcrum 83. Upward movement of the plunger 77 by centrifugal force is opposed by a spring 84 which acts on the lever between the fulcrum and the pin 80. The other end of the spring 84 engages a servo piston 85 disposed in a cylinder 86. The piston 85 is also engaged by one end of a lever 87 having an intermediate pivot 88. The other end of the lever 87 carries a cam follower 89 which engages a cam 90.

The pitch lock control valve includes a housing 91 having an inlet port 92, an outlet port 93 and a drain port 94. A plunger 95 is disposed within the housing 91 for reciprocable movement, the plunger including spaced lands 96, 97, 98 and 99. The plunger 95 also responds to centrifugal force in the direction of arrow 82, upward movement thereof being opposed by a spring 100, one end of which engages the plunger 95 and the other end of which engages a seat 101. The spring seat 101 supports a cam follower roller 102, which engages a cam 103. The cams 90 and 103 are interconnected by a mechanical linkage 104, which is positioned by a speed setting control lever 105. The speed setting of the pitch lock control valve 75 is maintained a predetermined amount above the speed setting of the governor valve 70. Moreover, the speed differential relationship between the pitch lock control valve and the governor valve is maintained substantially constant throughout the entire range of speed setting which is afforded by the cams 90 and 103.

The plunger 95 is formed with an axial bore 106 which communicates with the annular channels between lands 97 and 98 through ports 107, and with the annular groove between lands 98 and 99 through ports 108. The control port 93 is connected to passages 41 and 42 and the servo chamber 40. The drain port 94 is connected to a conduit 109 to drain through a spring-biased check valve 110 which assures that the servo chamber 40 will never be entirely depleted of fluid since a minimum pressure, for instance 20 p.s.i., is maintained therein at all times. However, the minimum pressure maintained in the servo chamber 40 is insufficient to prevent movement of the piston 39 by the resilient means 44.

The spring biased check valve 110 functions to maintain a minimum pressure in the servo chamber 40 and the passages 41 and 42 in the folowing manner. Since the check valve 110 is spring loaded, in order for fluid to flow to drain through the check valve 110, it must be under pressure sufficient to overcome the spring bias and open the check valve. In the disclosed embodiment a pressure in excess of 20 p.s.i. is required to open the check valve 110. As clearly seen in FIGURE 7, the piston head 39 cannot engage the right hand wall of the servo chamber 40 since the ratchet teeth 34 on the flange portion of the annulus 32 engage the ratchet teeth 31 on the master gear and thus prevent the piston 39 from further movement to the right as viewed in FIGURE 7 under the urge of springs 44. However, since the piston 39 is loaded between springs 44 the fluid within the servo chamber 40 will likewise be pressurized. Since check valve 110 will only be open when the pressure in servo chamber 40 is in excess of the predetermined minimum pressure, for instance 20 p.s.i., it is apparent that the check valve 110 in combination with the spring loaded piston 39 will function to maintain this minimum pressure within the servo chamber 40 when the pitch lock is engaged.

The selector valve 76 comprises a housing 111 having a rotary disc 112 in the bore thereof. The housing 111 has an inlet port 113 comunicating with the pressure line 73, and an outlet port 114 which connects with the cylinder 86 through conduit 115. The plug 112 is connected by a mechanical linkage 116 to a propeller condition lever 117. The lever 117 is also connected by a mechanical linkage 118 to one end of a lever 119. The other end of the lever 119 is connected by a mechanical linkage 120 to a rod 121 actuated by the feedback mechanism, shown schematically as comprising a cam slot 122 in the master gear 22 and a cam follower 123 attached to the rod 121. The intermediate point of the lever 119 is connected to a carriage 124 and positions a cam 125 engageable with the lever 81. The condition lever 117 includes a range of negative thrust operation indicated by the letter N, a governing range indicated by the letter G and a feathering range indicated by the letter F. When the condition lever 117 is in the governing range, propeller pitch is controlled by the governor valve 70 in a manner well known in the art. During propeller operation in the governing range, the speed setting of the governor valve 70 can be adjusted by positioning the lever 105. Simultaneously therewith the speed setting of the pitch lock control valve will be adjusted. The speed setting of the pitch lock valve 75 is 5% greater than the speed setting of the governor valve 70. Thus, when the propeller exceeds the speed setting of the governor valve by 5% for any reason, such as the loss of hydraulic pressure, the rupture of a hydraulic seal or the failure of the governor valve spring, the plunger 95 will respond to centrifugal force and move upwardly, as viewed in FIGURE 7, whereby passages 41 and 42 will be connected to drain port 94, the internal passage 106 and port 107. Hence, the resilient means 44 will effect movement of the pitch lock ring 32 into engagement with the master gear 22 so as to preclude rotation of the master gear in a decrease pitch direction. However, by virtue of the ratchet teeth 31 and 34, the propeller blades can always be moved in an increase pitch direction. During operation in both feathering and negative ranges, the governor valve plunger 77 is controlled by the cam 125 through the lever 119. At this time, it will be recalled the pitch lock ring is positively maintained in a disengaged position relative to the master gear. During the negative thrust operation, the plug 112 of the selector valve 76 is rotated in a clockwise direction so as to apply pressure fluid to the cylinder 86 and increase the load of the spring 84 on the lever 81. This is merely done to maintain the lever 81 in engagement with the cam 125.

Since the propeller blades are drivingly connected with the master gear 22, it is readily apparent that rotation of the propeller blades about their longitudinal axes will effect rotation of the master gear 22 about the horizontal propeller axis. Moreover, if the master gear 22 is restrained against rotation in one direction, the propeller blades will, likewise, be restrained against rotation in one direction. Hence, in order to limit movement of the propeller blades in a decrease pitch direction during propeller operation in the governing range, the present invention contemplates mechanical abutment means for preventing rotation of the master gear 22 in a decrease pitch direction when the propeller blades reach a predetermined low angle.

In order to achieve this result, the master gear 22 is formed with an annular extension 29 having a set of straight splines 30, which mate with a complementary set of straight splines 47 formed on the sleeve 48. The sleeve 48 is supported for rotation about the horizontal propeller axis on a second sleeve 132 coaxial with the sleeve 48. The sleeve 132 is piloted in the hub and carries sealing rings 133 and 134, which engage the master gear 22 and the hub 10, respectively.

Figure 5:
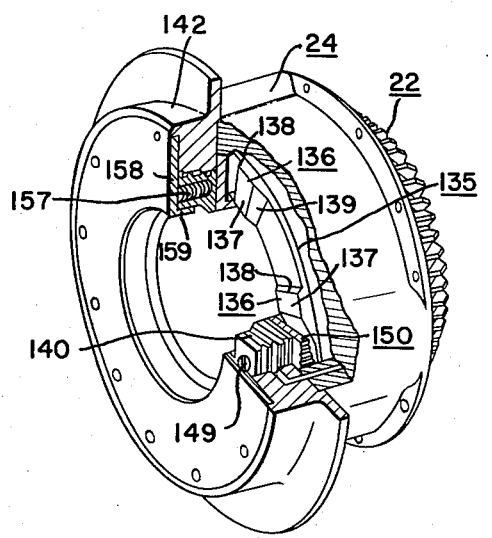
FIGURE 5 is an exploded perspective view, partly in section and partly in elevation, depicting the pitch stop mechanism.

The sleeve 48 is formed with a radially outward extending flange 135 having a partially toothed periphery 135a which constitutes a feedback gear. The flange 135, constituting a low pitch stop member, also has formed thereon five axially extending jaws 136. As seen diagrammatically in FIGURE 6 and structurally in FIGURE 5, the jaws 136 are formed with flat surfaces 137 lying in a plane substantially parallel to the plane of the flange 135, and perpendicular to the horizontal propeller axis, one end of the flat surface 137 terminating in an abrupt shoulder 138, and the other end being formed as a ramp 139. The abrupt shoulders 138 are substantially normal to the plane of the flange 135, whereas the inclined cam, or ramp surface 139, defines an acute angle with respect to the plane of the flange 135.

The sleeve 132 is, likewise, formed with a radially outward extending flange 140 having a stepped outer periphery so as to form a shoulder 141. The outer periphery of the flange 140 is received by the inner periphery of a ring 142 which is attached to the annular member 24 and the hub 10 by the bolts 25. The stepped outer periphery of the flange 140 carries sealing rings 143 and 144 which engage the inner stepped periphery of the ring 142. The flange 140 and the ring 142 define therebetween a servo chamber 145, which is connected by mating passages 146 and 147 in the ring 142 and member 24, respectively, to a hub passage 148.

The flange 140 has attached thereto, by a plurality of bolts 149, an annulus 150 located in juxtaposed relation to the flange 135 of the sleeve 48. The annulus 150 is formed with an exterior set of straight splines 151, which mate with a set of straight splines 152a on the member 24 whereby the annulus 150 is restrained against rotation relative to the member 24 and the hub 10. The annulus 150 also has formed thereon five circumferentially spaced, axially extending jaws 152 of identical construction with the jaws 136 on the flange 135. Thus, as depicted in FIGURE 6, the jaws 152 have flat surfaces 153 disposed in a plane parallel to the plane of the annulus 150, abrupt shoulders 154 located at right angles to the annulus 150 and inclined ramps 155 defining an acute angle with respect to the annulus 150.

The flange 140 of the sleeve 132 is also formed with a plurality of circumferentially spaced circular spring cavities 156 within which coil type compression springs 157 are disposed. The open ends of the cavities 156 are closed by a ring member 158 having an inturned flange 159, the ring 158 being secured to the ring 142, the member 24 and the hub 10 by the bolts 25.

Figure 6:
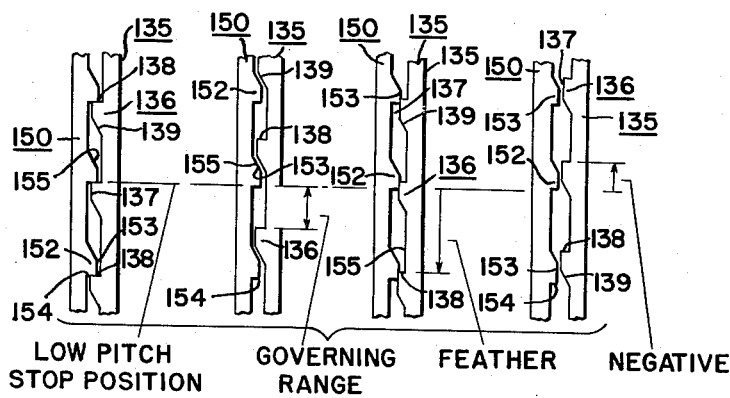
FIGURE 6 is a diagrammatic view illustrating operation of the low pitch stop.

With particular reference to FIGURE 6, the mode of operation of the releasable mechanical low pitch stop of this invention will be described in greater detail. When the propeller blades 12 move in a decrease pitch direction, the master gear 22 and the sleeve 48, FIGURE 1, which is integral with the jaws 136, rotate in a counterclockwise direction, as viewed in FIGURE 5, or upwardly, as viewed in FIGURE 6. Conversely, when the propeller blades 12 move in an increase pitch direction, the master gear 22 and the jaws 136 on the sleeve 48 rotate in a clockwise direction, as viewed in FIGURE 5 or downwardly, as viewed in FIGURE 6. When the servo chamber 145 is connected to drain, the annulus 150 is moved into an operative position, as depicted in the diagram labeled "Low Pitch Stop Position" and "Governing Range" of FIGURE 6. Accordingly, when the propeller blades reach a predetermined low angle, the shoulders 138 of the jaws 136 will abut the shoulders 154 of the jaws 152 so as to prevent further movement of the blades in a decrease pitch direction.

When the propeller blades are moved to the feathered position, the sleeve 48 moves downwardly, as viewed in FIGURE 6, from the position depicted in the diagram entitled "Governing Range" to the position depicted in the diagram entitled "Feather." In moving to this position, the ring 150 is moved axially to the left, as viewed in FIGURE 6, by reason of the inclined cam surfaces 139 and 155 of the jaws 136 and 152, respectively. In other words, as the sleeve 48 moves towards the feathered position, the jaws 136 ride up the inclined cam surfaces 155 of the annulus 150 and at the feathered position the flat surfaces 137 and 153 of the jaws 136 and 152, respectively, are in engagement.

When the servo chamber 145 is pressurized, the ring 150, as alluded to hereinbefore, is moved axially to the left to the position depicted in FIGURE 1. With the annulus 150 in this position, the coacting jaws on the sleeve 48 and the annulus 150 are maintained out of engagement and, hence, the sleeve 48 can be moved in a counterclockwise direction, as viewed in FIGURE 5, or upwardly as viewed in FIGURE 6, to the position indicated by the diagram entitled "Negative" in FIGURE 6. Thus, the propeller blades may be moved in a decrease pitch direction to an angle substantially below the mechanical low pitch stop angle of the governing range.

Referring again to FIGURE 7, a simplified hydraulic system for controlling the propeller having the pitch stop mechanism of this invention will be described. The pitch stop control valve 188 includes a casing 194 having an outlet 195, which is connected to the passages 146, 147, and 148. A two-landed plunger 196 is disposed within the valve casing 194, the plunger being urged upwardly by a coil spring 197, as well as the thrust of centrifugal force. The casing 194 also includes a drain port 198, which is normally closed by a spring-biased check valve 199.

The linkage 116 is shown connected to a propeller control lever 117 having a negative range of operation denoted by the letter N, a governing range denoted by the letter G, and a feathering range denoted by the letter F. The lever 117 is also connected by a mechanical linkage denoted by the numeral 118 to one end of a lever 119. The other end of the lever 119 is connected by a mechanical linkage 120 to the feedback mechanism depicted as comprising a rod 121, which follows a cam track 122 in the master gear 22. The intermediate point of the lever 119 positions a carriage 124, which carries a roller 125 arranged to cooperate with the lever 81.

The propeller blade 12 is shown having its blade gear 20 meshing with the master gear 22. The mechanical low pitch stop is diagrammatically shown as comprising a jaw 136 formed on the master gear 22, which cooperates with the jaw 152 of the flange 140 which has a piston surface. The passages 146, 147 and 148 communicate with the servo chamber 145, and the jaw 152 is normally maintained in operative position by spring 157.

When the propeller control lever 117 is in the governing range, the servo chamber 193 of the pitch stop control valve 188 is connected to drain. Accordingly, the spring 197 and the thrust of centrifugal force will move the plunger 196 upwardly to connected passages 146, 147, and 148 with the port 198 through port 195. The spring-biased check valve 199 assures that a minimum pressure, for instance, 20 p.s.i., will be maintained in the servo chamber 145, at all times. In this way, the quantity of fluid required to release the pitch stop will be maintained at a minimum. In the governing range, as alluded to hereinbefore, the pitch lock is operative to prevent movement of the blades 12 below a predetermined low blade angle.

When the propeller control lever 117 is moved into the negative thrust range, the rotary selector valve 76 will interconnect conduits 113 and 115. When conduit 115 receives pressure fluid, the load on the spring 84 is increased so that the lever 81 is maintained in engagement with the roller 125. At the same time, the servo chamber 193 is pressurized and plunger 196 moves downwardly to interconnect conduit 113 and passages 146, 147 and 148. Thus, the low pitch stop is released and the valve plunger 77 can be positioned through the lever mechanism 119 which moves the roller 125 so as to apply pressure fluid to the decrease pitch chamber and move the blades 12 to an angle below the minimum low pitch stop angle in the governing range.

When the propeller control lever 117 is moved to the feathered position, the lever mechanism 119 biases the plunger 77 upwardly. The low pitch stop mechanism is not released since the coacting inclined cam surfaces on the pitch stop jaws permit movement of the blades to the feathered position. Thus, fluid under pressure is merely supplied to the increase pitch chamber 62, while the decrease pitch chamber 63 is connected to drain.

While the embodiment of the present invention as herein disclosed, constitutes a preferred form, it is to be understood that other forms might be adopted.

What is claimed is as follows:

1. A variable pitch propeller including, a hub, a plurality of propeller blades journalled in said hub for rotation about their longitudinal axes to different pitch positions, means carried by said hub and operatively connected to said blades for adjusting the pitch position thereof, a member operatively connected to said blades so as to be rotated thereby and supported in said hub for rotation about the horizontal propeller axis, lock means engageable with said member under certain conditions for preventing rotation of said member and said propeller blades in a decrease pitch direction, a source of fluid under pressure, a fluid pressure actuated servo for mainatining said lock means disengaged from said member, a drain conduit, means for controlling said fluid pressure actuated servo comprising a speed sensitive valve having a first position for connecting said servo to said source of fluid under pressure and movable to a second position for connecting said servo to said drain conduit in response to a predetermined propeller overspeed, means for adjusting the speed setting of said speed sensitive valve, and a spring biased check valve in said drain conduit for maintaining a predetermined minimum pressure in said servo at all times.

2. A variable pitch propeller including, a hub, a plurality of propeller blades mounted in said hub for pitch changing movement, means operatively connected to said blades for changing the pitch thereof including a source of fluid under pressure, a master gear supported in said hub for rotation about the horizontal propeller axis and operatively connected to said blades so as to be rotated thereby, an axially movable lock ring engageable with said master gear including a single-acting servo for engaging and disengaging said lock ring under conditions, said lock ring when engaged preventing rotation of said master gear and said propeller blades in a decrease pitch direction, an annular element connected to rotate with said master gear having a plurality of circumferentially spaced, arcuate shoulders thereon, said lock ring having a plurality of circumferentially spaced, arcuate abutments engageable with said shoulders so as to prevent axial movement of said lock ring into engagement with said master gear under certain conditions, a valve for controlling the application of fluid under pressure to said servo, said valve being speed sensitive and operable in response to a predetermined propeller overspeed to interrupt application of fluid under pressure to said servo to permit the lock ring to engage said master gear, and a spring biased check valve connected with said servo for maintaining a predetermined minimum pressure in said servo at all times.

3. A variable pitch propeller including, a hub, a plurality of propeller blades mounted in said hub for pitch changing movement, means operatively connected to said blades for changing the pitch thereof including a source of fluid under pressure, a master gear supported in said hub for rotation about the horizontal propeller axis and operatively connected to said blades so as to be rotated thereby, an axially movable lock ring engageable with said master gear for preventing rotation thereof in a decrease pitch direction, said lock ring including a piston surface, resilient means engaging one side of said piston for urging said piston and said lock ring into engagement with said master gear, an annular element connected to rotate with said master gear having a plurality of circumferentially spaced, arcuate shoulders thereon, said lock ring having a plurality of circumferentially spaced, arcuate abutments engageable with said shoulders so as to prevent axial movement of said lock ring into engagement with said master gear under certain conditions, a servo chamber in said hub communicating with the other side of said piston surface, means for connecting said servo chamber to said source of fluid under pressure to maintain the lock ring disengaged under all conditions or connecting said servo chamber to drain to enable said resilient means to move said lock ring into engagement with said master gear, and means connected to said servo chamber for maintaining a predetermined minimum pressure therein at all times.

4. A combined mechanical pitch lock and low pitch stop assembly for a variable pitch propeller having a hub, a plurality of propeller blades mounted for pitch adjustment in said hub, means carried by said hub and operatively connected to said blades for varying the pitch position of said blades and coordinating the pitch changing movements thereof including a master gear rotatably journalled in said hub, including, in combination, a pitch lock ring restrained against rotation relative to said hub but movable axially relative thereto into and out of engagement with said master gear, said pitch lock ring when engaged with said master gear preventing rotation of said master gear in a pitch decrease direction, said master gear having an axially extending annular flange with a plurality of ratchet teeth on an end surface thereof, said pitch lock ring having a complementary set of ratchet teeth on an end thereof, a sleeve connected to rotate with said master gear, coengaging means on said sleeve and said pitch lock ring for positively preventing engagement of said pitch lock ring with said master gear when said master gear has a predetermined angular relationship with respect to said hub, a first low pitch stop member integral with said sleeve, and a second low pitch stop member restrained against rotation relative to said hub but movable axially relative thereto into and out of engagement with the first low pitch stop member.

5. The combination set forth in claim 4 wherein the coengaging means include a plurality of circumferentially spaced arcuate shoulders on said sleeve and an equal number of circumferentially spaced arcuate lugs on said pitch lock ring.

6. The combination set forth in claim 4 including spring means normally urging said pitch lock ring axially into engagement with said master gear.

7. The combination set forth in claim 6 including a single acting servo for moving said pitch lock ring axially out of engagement with said master gear.

8. The combination set forth in claim 4 including spring means engaging said second pitch stop member and normally maintaining said second pitch stop member in engagement with said first pitch stop member.

9. The combination set forth in claim 8 including a single acting servo for moving said second pitch stop member out of engagement with said first pitch stop member.

10. A combined mechanical pitch lock and low pitch stop assembly for a variable pitch propeller having a hub with a plurality of propeller blades journalled therein for rotation about their longitudinal axes and pitch changing means operatively connected with said blades for varying the pitch position thereof, including in combination, a master gear connected to all of the propeller blades and rotatable about the horizontal propeller axis for coordinating the pitch changing movements of said blades, a sleeve connected to rotate with said master gear, said master gear and said sleeve having a definite angular position for each pitch position of the propeller blades, releasable stop means engageable with said sleeve at a predetermined angle for preventing rotation of said sleeve in the decrease pitch direction, releasable lock means engageable with said master gear for preventing rotation of the master gear in the decrease pitch direction, and means on said sleeve engageable with said lock means to prevent engagement of the lock means with said master gear at predetermined pitch positions of said propeller blades.

11. The combination set forth in claim 10 including first spring means for engaging said stop means.

12. The combination set forth in claim 11 including second spring means for engaging said lock means.

13. The combination set forth in claim 11 including fluid pressure operated means for disengaging said stop means to permit rotation of said sleeve in the decrease pitch direction below said predetermined angle.

14. The combination set forth in claim 10 including spring means for engaging said lock means, and fluid pressure operated means for disengaging said lock means to permit rotation of said master gear in the decrease pitch direction.

15. The combination set forth in claim 10 including first spring means for engaging said stop means, second spring means for engaging said lock means, first fluid pressure operated means for disengaging said stop means, and second fluid pressure operated means for disengaging said lock means.

16. The combination set forth in claim 15 including manually operable means for controlling the operation of the first fluid pressure operated means, and a speed sensitive control valve assembly for automatically controlling operation of the second fluid pressure operated means.

References Cited in the file of this patent

UNITED STATES PATENTS

| | | |
|---|---|---|
| 1,558,002 | Ferris | Oct. 20, 1925 |
| 1,909,767 | Johnson | May 16, 1933 |
| 2,392,364 | Caldwell | Jan. 8, 1946 |
| 2,402,065 | Martin | June 11, 1946 |
| 2,487,239 | Hardy | Nov. 8, 1949 |
| 2,609,057 | Crowhurst | Sept. 2, 1952 |
| 2,655,999 | Basevi | Oct. 20, 1953 |
| 2,703,148 | Pearl | Mar. 1, 1955 |